(12) United States Patent
Halle

(10) Patent No.: US 8,530,037 B2
(45) Date of Patent: *Sep. 10, 2013

(54) WINDOW TRIM APPARATUS AND METHODS FOR MAKING AND USING SAME

(76) Inventor: John Halle, Ladera Ranch, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/872,624

(22) Filed: Aug. 31, 2010

(65) Prior Publication Data

US 2011/0047911 A1    Mar. 3, 2011

Related U.S. Application Data

(63) Continuation-in-part of application No. 11/704,468, filed on Feb. 9, 2007, now Pat. No. 7,785,684.

(60) Provisional application No. 60/818,189, filed on Jun. 30, 2006.

(51) Int. Cl.
| | |
|---|---|
| *B65D 65/28* | (2006.01) |
| *G09F 3/00* | (2006.01) |
| *B32B 3/28* | (2006.01) |
| *B32B 3/30* | (2006.01) |
| *B32B 3/00* | (2006.01) |

(52) U.S. Cl.
USPC ............................. 428/167; 428/43; 428/156

(58) Field of Classification Search
USPC ................... 428/40.1, 43, 156, 167, 131, 172
See application file for complete search history.

(56) References Cited

U.S. PATENT DOCUMENTS

| | | | |
|---|---|---|---|
| 4,537,809 A | 8/1985 | Ang et al. | |
| 6,694,696 B2 * | 2/2004 | Hagel | 52/656.4 |
| 7,220,472 B2 | 5/2007 | Rivest | |
| 7,785,684 B2 * | 8/2010 | Halle | 428/40.1 |
| 2007/0020425 A1 | 1/2007 | Rivest | |

OTHER PUBLICATIONS

TrimQuick brochure (Indicating "Marketed Aug. 15, 2005").
http://web.archive.org/web/20040205011309/http://www.trimquick.com, Feb. 2, 2004, Home Page.
http://web.archive.org/web/20040205011309/http://www.trimquick.com, Feb. 2, 2004, TrimQuick Product Details.
USPTO Office Action dated Jun. 10, 2009 in related U.S. Appl. No. 11/704,468, filed Feb. 9, 2007.
USPTO Office Action dated Nov. 16, 2009 in related U.S. Appl. No. 11/704,468, filed Feb. 9, 2007.

* cited by examiner

*Primary Examiner* — Catherine A Simone
(74) *Attorney, Agent, or Firm* — Stout, Uxa, Buyan & Mullins; Carlos A. Fisher

(57) ABSTRACT

Window trim apparatus are provided that include scored grooves made by methods other than extrusion. Also provided are methods and apparatus for manufacturing and using same.

30 Claims, 16 Drawing Sheets

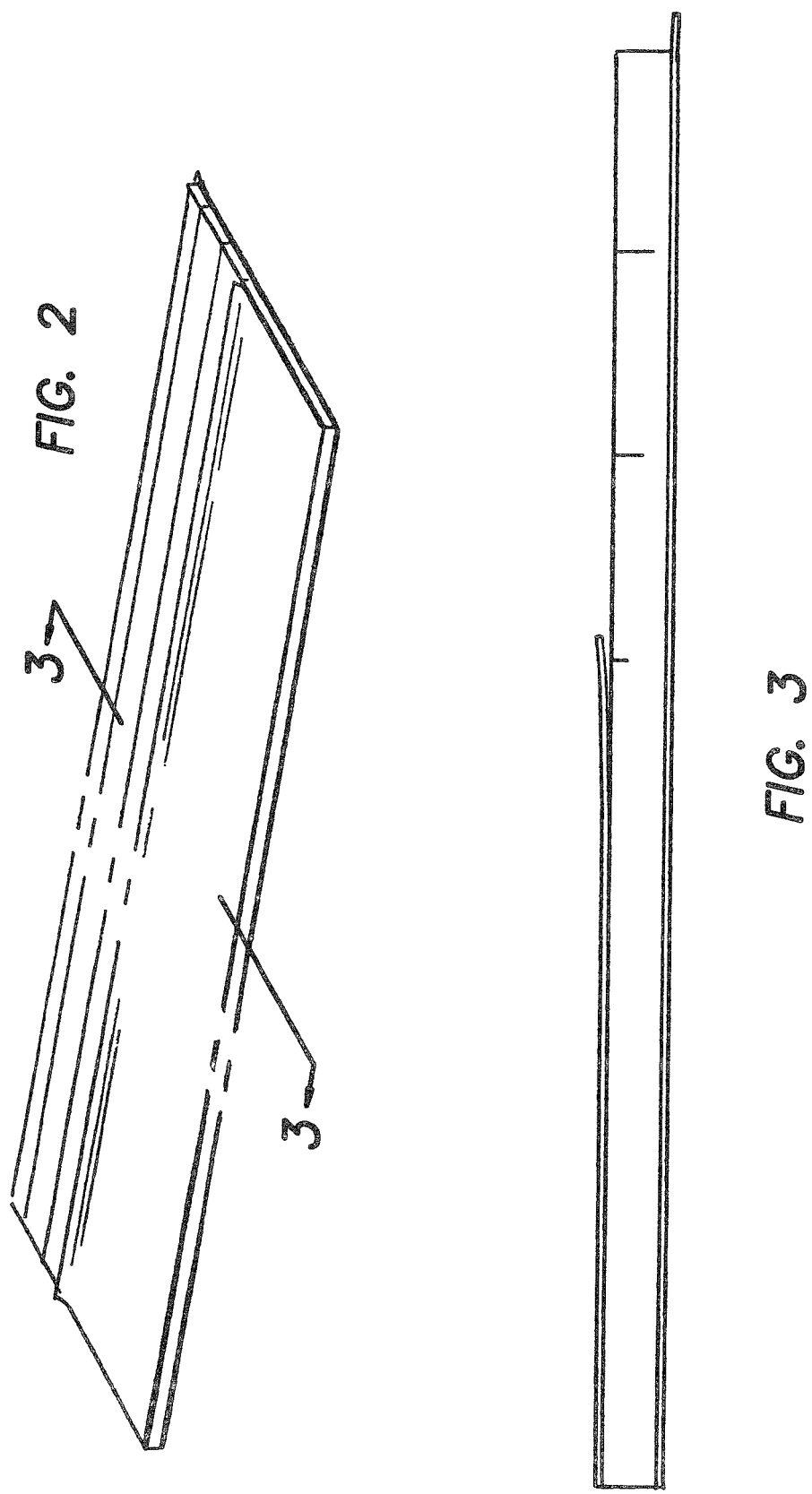

WINDOW TRIM APPARATUS AND METHODS FOR MAKING AND USING SAME

RELATED APPLICATIONS

This application claims priority pursuant to 35 USC §120 to U.S. patent application Ser. No. 11/704,468, filed Feb. 9, 2007, now U.S Pat. No. 7,785,684, which claimed priority pursuant to 35 USC §119(e) to U.S. Provisional Application Ser. No. 60/818,189, filed on Jun. 30, 2006; the entire content of each of which is incorporated herein in its entirety.

FIELD OF THE INVENTION

The present invention relates to window trim and methods for making and using same. In a particular embodiment, the invention relates to window trim with scored grooves, in particular, blade-scored grooves that are easily tearable, structured to provide window trim that can be more easily made to fit a desired window size, preexisting window frame, or wall space surrounding a preexisting window without requiring the installer to utilize specialized cutting instruments. In other aspects, the invention includes methods for making and using same.

BACKGROUND OF THE INVENTION

Homeowners and builders seeking to renovate or restore existing homes often wish to alter the existing windows or window frames. In some cases the old decorative portion of the window frame is removed or replaced, either as a consequence of replacing a window, or simply in order to renovate the "look" of an old window. In such cases the window is mounted into an existing (or similar) structural portion of the window frame, leaving a gap between the mounted window and this structural portion of the frame (usually, but not always made of metal such as steel or aluminum alloys; other frames may be made of, for example, wood) into which it is mounted.

Such a resulting gap can be non-uniform, such that it is larger on one side or another, or at the top or bottom. While installers may be able to center the windows during installation, an aesthetically acceptable centering is not always possible. Additionally, the gap at the top of the window is often wider than the gap at the bottom, and centering from top to bottom is more difficult.

As one way of improving the cosmetic appeal of such window installations or window frames and filling the gaps between windows and structural frames installers have used flat polymeric window trim strips to cover the gaps between window and frame. These flat window trim strips may optionally have an adhesive such as an adhesive strip on one side permitting them to be affixed to the underlying structural window frame thereby covering or filling the gaps, and may be attractively colored or patterned on the front visible decorative surface.

Because the gaps vary in size, manufacturers sell a range of window trim in different widths, which can be used as-is, or cut down to the desired width in the field by the installer. Cutting down a wider trim to the desired width is often preferred by the installers to keeping multiple different widths in inventory. However, the time, inconvenience and skill required to make a uniform cut into a window trim strip can lead to waste, added expense, and aesthetically variable lack of uniformity for the homeowner.

Solutions to this dilemma have been proposed; for example, in Rivest, U.S. Pat. No. 7,220,472 and U.S. Patent Publication No. 2007/0020425 a trim strip with score lines is proposed; these score lines may be used as a guide for cutting the trim material with a utility knife, or may be bent and flexed along the score line in order to separate the trip strip into two pieces. Rivest advise that running a utility knife or blade down the length of the appropriate score line will "allow the trim to be more easily separated than if the trim material is simply bent along the score line. Rivest at [0047]. However the need to use a utility knife or blade down the length of the appropriate score line in the trim strips of Rivest is still time and labor intensive, making the score lines more a true "guide" to making uniform cuts with a knife than a good alternative to the use of a knife or other tool. Moreover, since the trim is more easily separated using a knife than breaking the trim, breaking the trim is even more time and labor intensive.

Customizable trim such as that of Rivest is generally made by extruding polyvinyl chloride (or a similar polymeric material) through an extrusion die; the die may have one or more small tooth on one interior surface. This die thus creates shallow furrows or grooves on the bottom surface of the trim; these furrows can then be used as guides for a knife used to cut the trim. However, die-formed furrows have a number of drawbacks, including the potential for accidents resulting from the knife slipping on the trim strip, or sore hands resulting from trying to snap the trim apart or flex the trim back and forth repetitively either along the groove or after scoring it with the knife. Additionally, the use of extrusion dies to form such grooves produces shrink lines on the side of the trim opposite to the furrows, due to uneven shrinkage of the extruded polymerid material after the extrudate cools down. Such shrink lines are visible on the exposed ("front") side of the trim after installation, which is aesthetically undesirable. However, there is a trade off in using such furrowed trim strips: the deeper the furrows are (and thus, the easier to cut the trim is), the more prominent the undesirable shrink lines on the front surface become.

Accordingly, there is a need in the art for customizable polymeric trim that is easy to cut to a necessary width in the field, but is smooth on the top surface so as to remain aesthetically pleasing. Additionally there is a desire among installers for a trim strip that is faster to install, less dependent on specialized equipment such as blades or knives, does not cause substantial fatiguing or bruising on the installer's hands and which results in less waste and greater aesthetic predictability.

In addition, there is a desire among manufacturers of polymeric window trim for improved methods for making polymeric window trim stripping which is customizable, uniform easy to cut, and smooth on the front surface so as to remain aesthetically pleasing. Such manufacturers particularly value manufacturing methods that have at least one advantage which may include: product uniformity from lot to lot, low cost of manufacture, relatively low equipment capitalization costs through the use of largely pre-existing equipment and materials, and relative simplicity of manufacture.

SUMMARY OF THE INVENTION

In one embodiment, the invention provides a polymeric window trim apparatus comprising a substantially flat, elongated polymeric window trim element having a front surface and an opposing back surface and at least one longitudinally extending, blade-cut groove on at least one such surface, wherein the groove is formed by a stationary blade after extrusion and at least a measurable amount of hardening. Such grooves shall be termed "blade-cut" grooves herein to distinguish them from the grooves made by a die on the substantially molten extrudate during the extrusion process. These grooves may be substantially V-shaped, have a width and slice through fibers of the polymeric material which comprises the trim strip.

In another embodiment, the window trim apparatus comprises plurality of longitudinally extending substantially V-shaped blade-cut grooves (e.g., two, three, four, five or more grooves). In a preferred embodiment, the grooves are substantially straight and substantially parallel. In another preferred embodiment, the surface opposite to the longitudinally extending blade-cut grooves is substantially smooth. Preferably, the grooves are located on the back surface of the trim apparatus, and the substantially smooth surface is the front surface.

In another embodiment, at least two of the longitudinally extending blade-cut grooves have different depths with respect to each other. Preferably, at least three of the longitudinally extending blade-cut grooves have different depths with respect to each other. Even more preferably, all of the longitudinally extending blade-cut grooves have different depths with respect to each other.

In a further embodiment, the window trim apparatus comprises at least two longitudinally extending blade-cut grooves, wherein the depth of each such groove decreases as its distance from a proximal edge of the window trim apparatus increases.

In one embodiment, at least one longitudinally extending blade-cut groove has a depth of about 15%, or about 16% or about 19% of the total thickness of the window trim apparatus. In this or another embodiment of the invention, at least one longitudinally extending blade-cut groove has a depth of about 23% or about 25% or about 28% or about 30% of the total thickness of the window trim apparatus. In this or another embodiment of the invention, at least one longitudinally extending blade-cut groove has a depth of about 33% or about 35% or about 38% or about 40% of the total thickness of the window trim apparatus. In this or another embodiment of the invention, at least one longitudinally extending blade-cut groove has a depth of about 43% or about 45% or about 48% or about 50% of the total thickness of the window trim apparatus. In this or another embodiment of the invention, at least one longitudinally extending blade-cut groove has a depth of about 53% or about 56% or about 58% or about 60% or about 64% or about 66% or about 68% or about 70% of the total thickness of the window trim apparatus. In certain embodiments the window trim apparatus may have one, or two, or three, or more longitudinally extending blade-cut grooves. Preferably at least two of such grooves are of different depths; very preferably if there are more than one groove, a first deeper groove is located closest to the proximal edge of the window trim apparatus, and a second, shallower groove is located farther from said edge than the first groove.

In this context the term "thickness" means the dimension (commonly, though not exclusively expressed in inches) of the window trim apparatus extending between the front surface and the bottom surface.

In certain embodiments, the window trim apparatus comprises at least one longitudinally extending blade-cut groove having a depth of about ⅔ the thickness of the window trim apparatus. In another embodiment, the window trim comprises at least one longitudinally extending blade-cut groove having a depth of about ½ the thickness of the window trim apparatus. In another embodiment the window trim comprises at least one longitudinally extending blade-cut groove having a depth of about ⅓ the thickness of the window trim apparatus. In a particularly preferred embodiment the window trim apparatus has at least two longitudinally extending blade-cut grooves in which the depth of each groove decreases as a function of its distance from a proximal edge of the trim apparatus.

In a particularly preferred embodiment of the window trim apparatus, a first longitudinally extending blade-cut groove has a depth of no less than about 0.001 inch, or about 0.0018 inch, the thickness of the window trim apparatus. In an even more preferred aspect of this embodiment, the window trim apparatus comprises a plurality of longitudinally extending blade-cut grooves, and the first groove is closest of the grooves to a proximal edge of the window trim apparatus. Preferably, all the longitudinally extending grooves are substantially straight and substantially parallel to each other and to the proximal edge of the window trim apparatus.

In another preferred embodiment of the window trim apparatus, a first longitudinally extending blade-cut groove has a depth of no more than about 66% the thickness of the window trim apparatus, and a second longitudinally extending blade-cut groove has a depth of at least about 16% the thickness of the window trim apparatus. There may be a third first longitudinally extending blade-cut groove having a depth between those of the first and second blade cut grooves, and located substantially parallel to and between the first and second grooves.

In another embodiment, the distance between a proximal edge of the window trim apparatus and at least one longitudinally extending blade-cut groove is about 10-19%, or about 20-29%, or about 30-39%, or about 40-50% of the total width of the window trim apparatus.

In another embodiment, the invention provides a window trim apparatus that comprises at least one substantially straight longitudinally extending blade-cut groove, wherein said longitudinally extending blade-cut groove is located about ⅐ of the width of the window trim apparatus from a proximal edge of the window trim apparatus and substantially parallel to said edge. In another embodiment of the invention, said longitudinally extending groove is spaced about ²⁄₇ of the width of the window trim apparatus from a proximal edge of the window trim apparatus, and substantially parallel to said edge. In another embodiment of the invention, said longitudinally extending blade-cut groove is spaced about ³⁄₇ of the width of the window trim apparatus from a proximal edge of the window trim apparatus, and substantially parallel to said edge. Preferably the window frame apparatus of these embodiments comprises at least two longitudinally extending, substantially parallel blade-cut grooves wherein a third longitudinally extending blade-cut groove is spaced about ³⁄₇ of the width of the window trim apparatus from the same edge of the window trim apparatus. In a preferred embodiment, the window trim apparatus comprises three substantially straight longitudinally extending blade-cut grooves, wherein a first groove is located about ⅐ inch of the width of the window trim apparatus from a proximal edge of the apparatus, a second groove is located about ²⁄₇ inch of the width of the window trim apparatus from a proximal edge of the apparatus, and a third groove is located about ³⁄₇ inch of the width of the window trim apparatus from a proximal edge of the apparatus, and wherein the grooves are substantially parallel to each other.

In another embodiment, the window trim apparatus of the invention is about ¹⁄₁₆ of an inch thick. In either the same or another embodiment, the window trim apparatus is about 1¾ inches wide. In yet another embodiment, the window trim apparatus comprises three substantially parallel longitudinally extending grooves, wherein at least one longitudinally extending groove is at least about 0.015 inches deep. In another embodiment, at least one longitudinally extending groove is about 0.025 inches deep. In another embodiment, at least one longitudinally extending groove is about 0.040 inches deep. In a further embodiment, the window trim apparatus comprises a first, a second, and a third substantially parallel longitudinally extending groove, wherein the first groove is about 0.015 inches deep, the second groove is about 0.020 inches deep, and the third groove is about 0.040 inches deep.

In still another embodiment, the window trim apparatus comprises three substantially parallel longitudinally extending grooves, wherein the first longitudinally extending groove is spaced about ¼ of an inch from one edge, wherein the second longitudinally extending groove is spaced about of an inch from the same edge, and wherein the third longitudinally extending groove is spaced about ¾ of an inch from the same edge. In other embodiments, the window trim apparatus comprises at least one groove spaced a distance from a proximal edge of said trim selected from the group consisting of about ¼ inch, about ½ inch, and about ¾ of an inch.

In another embodiment, the window trim apparatus of the invention comprises a polymeric composite material. In another embodiment, the window trim apparatus comprises a color component; in a preferred aspect of this embodiment, the color component causes the window trim apparatus to have a white color. In another embodiment, the window trim apparatus comprises a polyvinyl chloride (PVC) component. In yet another embodiment, the window trim apparatus comprises a titanium dioxide component.

In another embodiment, the window trim apparatus of the invention comprises a protective liner on a side of the apparatus. Preferably, the protective layer is located on the side opposite to the side comprising the longitudinally extending blade-cut grooves. In another embodiment, the protective liner is selected from a paper component and a polymeric film. The polymeric film may comprise any suitable polymer, and may, without limitation, be selected from the group consisting of a polyethylene component, a polypropylene component, a polycarbonate component and polyacrylate component. In one embodiment, the protective liner comprises a polymeric film comprising a polyethylene component. In another embodiment, the protective liner is about 1-5 mil thick. In a further embodiment, the protective liner is about 2 mil thick. In a preferred embodiment, the protective liner is removable from the surface of the window trim apparatus.

In another embodiment, the window trim apparatus of the invention comprises an adhesive component preferably located on a side of the trim apparatus opposite to that of the protective layer. Even more preferably, the window trim apparatus is located between at least one longitudinally extending groove and one edge of the window trim apparatus. In a preferred embodiment, the adhesive component is located in a region of said surface that is free of longitudinally extending grooves.

In one embodiment, the adhesive component is extruded onto the trim during manufacture of the trim. In another embodiment, the adhesive is 0.001-0.20 inches thick. In another embodiment, the adhesive is about 0.10 inches thick. In another embodiment, the adhesive component comprises a pre-fabricated adhesive sheet affixed to one side of the window trim apparatus. In another embodiment, the adhesive comprises a rubber component, preferably a vulcanized rubber component. In a further embodiment, the adhesive component of the apparatus is covered by a removable adhesive liner.

Preferably, the adhesive liner may be made of any suitable material that is removable when the trim apparatus is ready for installation. Liners may, without limitation, be comprised of paper components and polymeric components, such as a polymeric film. In another embodiment, the adhesive liner extends beyond the boundary of the adhesive component, such as for example, about 3/16 of an inch past the boundary of the adhesive component.

In another embodiment, a method for manufacturing a window trim element is disclosed, said method comprising the steps: an elongated window trim blank having a front surface and an opposing back surface; and cutting at least one longitudinally extending groove on at least one surface of the blank using a blade. In a preferred embodiment, the blade comprises a stationary blade.

In another embodiment, a method for manufacturing a customizable window trim element is disclosed, said method comprising the steps; providing an elongated window trim blank having a front surface and an opposing back surface, and cutting at least one longitudinally extending blade-cut groove on at least one surface of the blank. In a preferred embodiment at least one dimension of the resulting window trim apparatus may be reduced by tearing or breaking the window trim apparatus along at least one longitudinally extending groove. It will be understood that the term "tear" or "tearing" means to manually move one or both portions of the window trim apparatus of either side of the groove in a direction opposite the other to separate the portions from each other along the groove. Preferably the tearing process begins substantially at one end of the segment of window trim apparatus and manually rips or tears apart two segments of the apparatus along the selected groove in the direction of the other end of the window trim apparatus; very preferably without using a blade or other tool. "Breaking" is distinct from tearing, and begins by folding two segments of the apparatus along the selected groove towards each other until the window trim apparatus separates along the groove. Preferably the window trim apparatus is reduced by tearing. In a preferred embodiment, said at least one dimension of the resulting window trim apparatus may be reduced without using a blade to cut through or score said at least one groove.

The longitudinally extending blade-cut groove or grooves of the disclosed window trim apparatus are preferably formed using a blade following extrusion of the window trim apparatus through a forming die. In a preferred (although not necessarily exclusive) embodiment, the blade comprises a stationary blade. Other methods may involve manually introducing the blade-cut grooves. In another embodiment the grooves are made by means other than by an extrusion process, such as other than through the use of an extrusion die.

In another embodiment, the invention provides a method for manufacturing a window trim element comprising: forming an elongated window trim blank having a front surface and an opposing back surface; and cutting at least one longitudinally extending groove on at least one surface of the blank while the blank is at an elevated temperature.

In a further embodiment, the methods comprise cutting a plurality of longitudinally extending blade-cut grooves (e.g., two, three, four, five or more grooves) using the same cutting method as used for the first groove.

In a preferred embodiment, the window trim blank is supported by a rotatable wheel during the cutting step. In a further preferred embodiment, the wheel is substantially round.

In another embodiment, the window trim blank is formed at least in part using an extrusion process. In another embodiment, the window trim blank is cooled before the cutting step.

In another embodiment, the method includes applying an adhesive component to the surface of the blank. In a further embodiment, the method includes applying a removable adhesive liner over the adhesive component. In still a further embodiment, the method includes applying a removable protective liner to the surface of the blank. Preferably, although not exclusively, the protective liner comprises a polymeric component.

In another embodiment, the invention provides an apparatus for producing window trim elements, the apparatus comprising: an extrusion assembly structured to form an elongated window trim blank from an extrudable polymeric material and a cutting assembly for cutting at least one longitudinally extending groove in said blank, wherein said groove is substantially parallel to at least one edge of said window trim blank. In a preferred embodiment, the cutting apparatus comprises at least one stationary blade. In another embodiment, the cutting assembly comprises a plurality of stationary blades. In still another embodiment, the cutting assembly comprises a rotatable wheel used to support the elongated window trim blank on one side of the blank while at least one longitudinally extending blade-cut groove is made in the other side of the blank. In another embodiment the cutting assembly comprises a slick surface upon which at least a portion of one side of said blank is supported while at least one longitudinally extending blade-cut groove is made in the other side of the blank. Preferably, said slick surface comprises a non-stick-component such as, without limitation, a TEFLON® or TEFLON® -like non-stick component applied to said surface.

The present invention may comprise, without limitation, any combination of elements or embodiments disclosed in this specification, including the claims. Other features and advantages of the invention will be apparent from the following detailed description and claims.

BRIEF DESCRIPTION OF THE DRAWINGS

FIG. 2 is a diagram of a window trim apparatus of the present invention.

FIG. 3 is a cross-sectional diagram of a window trim apparatus of the present invention.

DETAILED DESCRIPTION OF THE INVENTION

The present invention relates to window trim with pre-cut grooves and methods for making and using same. The present invention provides an improved window trim apparatus in which at least one dimension of the trim may be easily varied by an installer. In certain embodiments this window trim comprises at least one longitudinally extending groove made by a method other than extrusion methods. In certain embodiments the window trim comprises at least one longitudinally extending groove formed after leaving an extrusion forming die. In certain embodiments the window trim comprises at least one longitudinally extending groove made after a cooling step. Preferably the groove or grooves are made using a blade. In a particularly preferred embodiment a stationary blade is used to cut grooves in window trim elements provides window trim that is both easily customizable in the field and substantially smooth on the side opposite the grooves. The following description of the figures is drawn to additional currently preferred embodiments of the invention, which is not limited in any way thereby.

Figure 1:
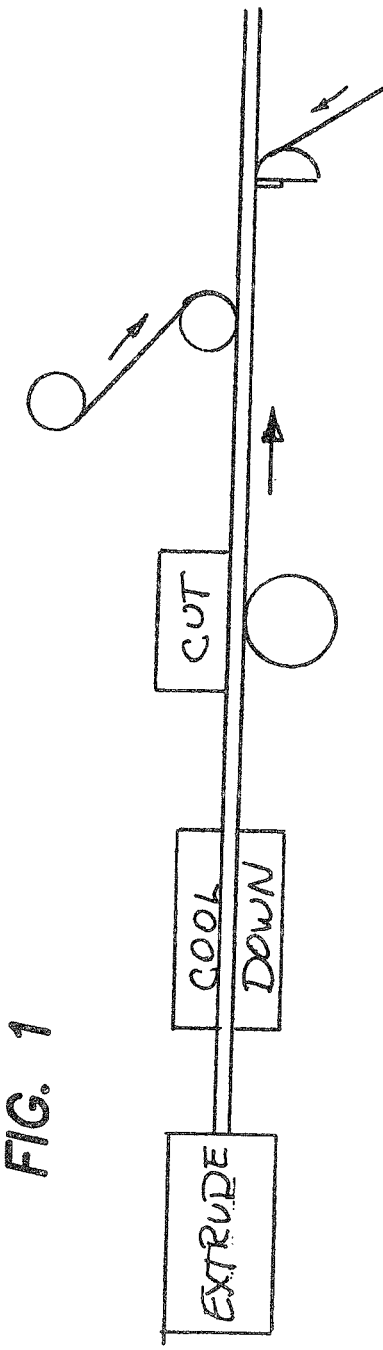
FIG. 1 is a schematic flow diagram of a method of making window trim in accordance with the present invention.

FIG. 1 is a schematic flow diagram of an exemplary method of making window trim in accordance with the present invention. An extrusion assembly 12 extrudes a window trim blank 13 at an elevated temperature. The window trim blank 13 is then cooled by submersion in water 14 and passed under a cutting assembly 15, which cuts at least one longitudinally extending groove in the front surface 1 of the window trim blank. When passed under the cutting assembly 15, the polymeric material 14 is supported by a rotatable wheel 16. Adhesive 7 is applied to the front surface 1, a removable adhesive liner 8 is applied over the adhesive 7, and a removable protective liner 10 is applied to the opposing surface 2.

FIG. 2 an elevated diagram of a window trim apparatus according to the current invention, as viewed from the front surface 1. The front surface 1 comprises three longitudinally extending grooves 3. The window trim apparatus includes adhesive 7 on the front surface 1 between the distal edge 5 and the grooves 3, a removable adhesive liner 8 that covers the adhesive 7 and extends beyond the adhesive boundary 9.

FIG. 3 is a perspective view of the window trim apparatus shown in FIG. 2, through a cross-section along axis 22. The window trim apparatus in FIG. 3 includes a front surface 1 and an opposing back surface 2. The front surface 1 comprises three longitudinally extending grooves 3 cut by a stationary blade. Each groove 3 is a different depth, with the grooves progressively deeper the closer they are to the proximal edge 6 of the window trim apparatus. The window trim apparatus in FIG. 3 includes adhesive 7 on the front surface 1 between the distal edge 5 and the first groove 3, a removable adhesive liner 8 that covers the adhesive 7 and extends beyond the adhesive boundary 9, and a removable protective liner 10 on the opposing back surface 2.

Figure 4A:
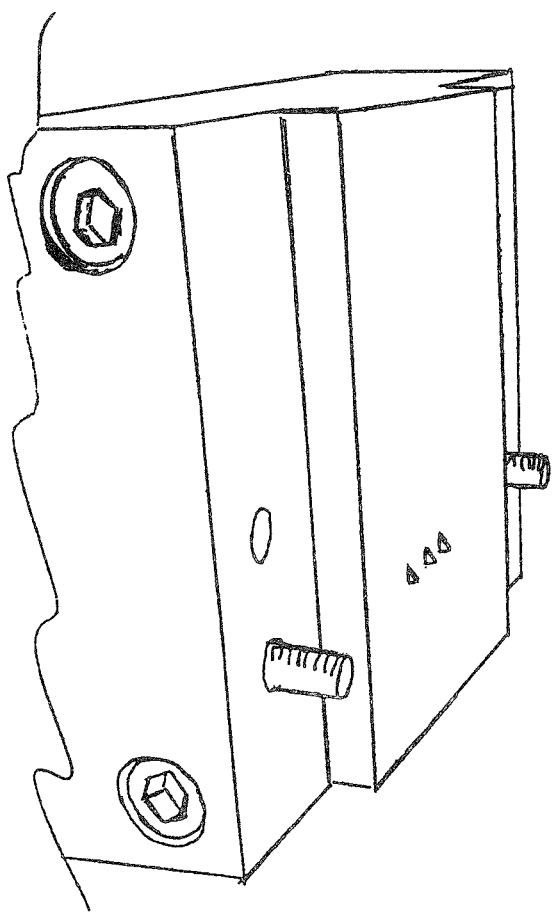
FIG. 4a is a diagram of a stationary blade assembly used to cut grooves in window trim in accordance with the present invention.

FIG. 4A is a diagram of a cutting assembly 15 that may be used to cut the longitudinally extending grooves 3 according to the invention. The cutting assembly 15 comprises knife blades 17, extending from a substantially planar surface 24, and a housing 18 that anchors the blades 17 and keeps them stationary. Each of the blades 17 extend from the surface 24 at a precisely defined length, in order to cut reproducible grooves 3 of different depths in the same window trim apparatus.

Figure 4:
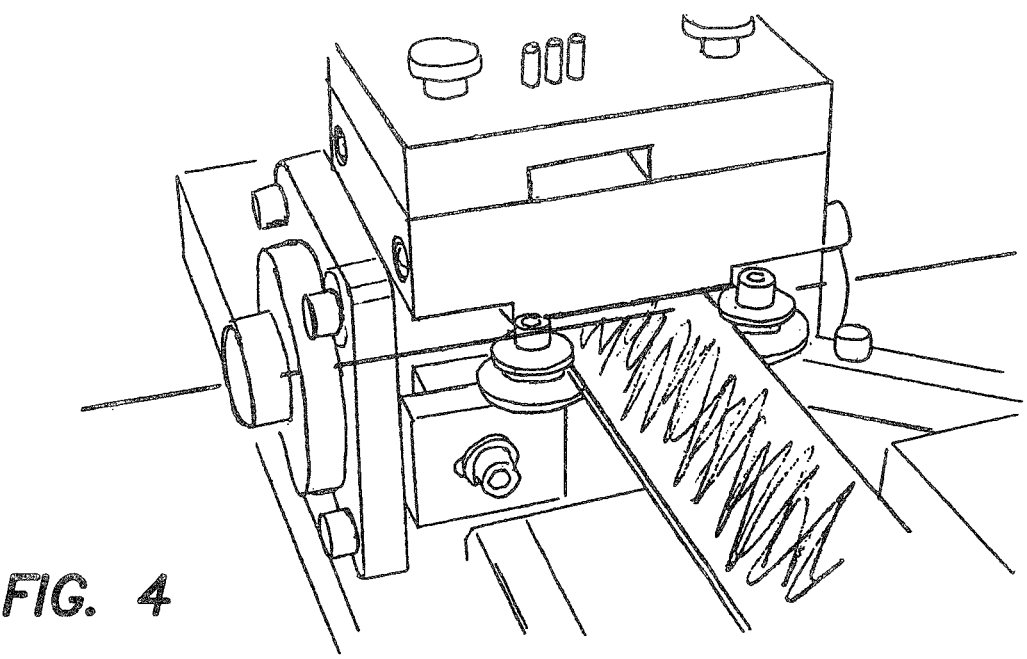
FIG. 4 is a diagram of the cutting assembly used in accordance with the methods of the invention.

FIG. 4 is a diagram of a cutting assembly 15 positioned over a window trim blank 13. Guide wheels 19 positioned at the edges of the window trim blank 13 keep the window trim blank from moving to one side or the other, so that the grooves cut by the stationary blades are substantially straight.

Figure 5:
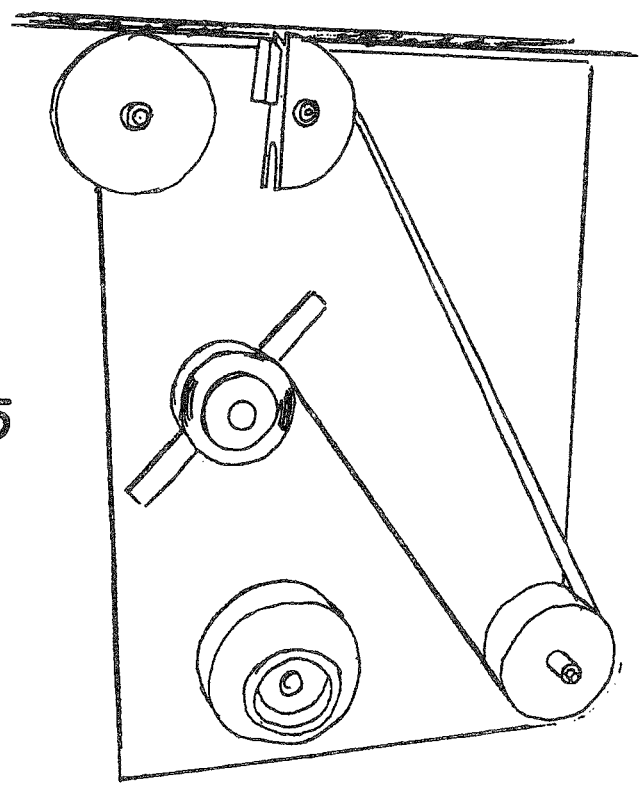
FIG. 5 is a diagram of an assembly used to apply a protective liner to the window trim in accordance with the present invention.

FIG. 5 is a diagram of a protective liner application assembly 20. The protective liner 10 is applied to the opposing back side 2 of the window trim blank 13.

The window trim apparatus of the present invention is preferably produced by extrusion of a polymeric material through a die in the preferred shape of the window trim being produced. The polymeric material may be any polymeric material suitable for use as window trim, including, but not limited to, polyvinyl chloride (PVC) and other plastics such as, without limitation, polycarbonate, polypropylene, or polyacrylate. The polymeric material may be substantially pure, or it may have other materials incorporated therein, including color components such as titanium dioxide. The polymeric material is typically extruded through the die at a temperature sufficient to make the polymeric material malleable. A preferred temperature for extruding PVC is 380° F. (193° C.)

After extrusion, the window trim may be cut with one more stationary blades. Preferably, the extruded window trim is cooled to a temperature that is cool enough to cut with a blade without creating shrink lines, but hot enough such that wear on the blades is minimized. A preferred temperature for cutting PVC is 200° F. (93° C.). The extruded window trim may be cooled by any appropriate methods, for example, exposure to air or water of a desired temperature. A preferred method is to submerge the window trim apparatus in water.

When the grooves are made using one or more blades, the blades used to produce the window trim apparatus of the invention may be made of any material sufficiently strong to score the polymeric material of the window trim. Preferably, the blades are made from metal or a metal alloy that retain their edge while scoring large quantities of window trim. The blades may, for example, be made of stainless steel, or, preferably, a carbide alloy. Preferably, the blades are cut at an angle to enable the maximum lifetime for each blade, and to create deep scores while minimizing friction. In one embodiment, the blades may be submerged in water during use to lubricate and cool the blades.

In a preferred embodiment, the blades are held in place by a housing. If more than one groove is desired, the number of blades corresponding to the number of desired grooves may be placed an appropriate or distance from each other in the housing. If grooves of different depths are desired, the blades may extend from the planar surface of the housing by different lengths. Preferably, the housing holding the blades is oriented above the extruded window trim blank, which is then moved past the blades as they score the grooves into the front surface of the window trim (during scoring, the front surface is preferably oriented upwards). The window trim blank is preferably supported from below by a circular wheel, which can rotate as the window trim blank moves past the blades. The use of such a wheel helps to prevent the back surface of the trim from being scratched during the scoring step. The wheel is preferably made from a material such as a metal or metal alloy (e.g., steel). The window trim is also preferably passed between guides (e.g., guide wheels or projections) to keep the trim in proper side to side orientation during the scoring operation, in order to keep the grooves substantially straight.

In one embodiment, the window trim blank may be scored successively, or serially, by the use of more than one cutting assembly positioned at different locations along the manufacturing line. By scoring the window trim in such a manner, it allows one cutting assembly to be replaced when the blades are dulled by the second or subsequent cutting assemblies without stopping other steps of production, or without wasting trim that would not get scored while new blades are put in place. For example, when a set of blades in a first cutting assembly needs to be replaced, a second cutting assembly containing blades in the same orientation may be placed over the trim, after which the first cutting assembly is removed.

In a preferred embodiment, the window trim component of the present invention comprises an adhesive component on the front surface, which may be used to attach the trim to a window frame. The adhesive component may be applied in any conventional manner, and is preferably extruded (e.g., by a hot melt applier) onto the trim. The adhesive may be smoothed out (e.g., by a heated blade applier). A preferred ingredient of the adhesive component a rubber, preferably a vulcanized rubber. When using a rubber in an adhesive component, care should be taken to prevent disintegration of the adhesive component due to rubber tendency to break down in UV sunlight. Accordingly, one method of preventing such adhesive damage is to use an opaque additive in the window trim, and an adhesive liner. In one preferred embodiment, the opaque additive may comprise titanium dioxide.

After application of adhesive to the trim, a removable adhesive liner, preferably opaque, may be applied, and the adhesive component may be cooled (e.g., using chilling bars). Preferably, the adhesive liner extends beyond the boundary of the adhesive so that it can be easily grasped by a person wishing to remove the liner.

In another embodiment, a removable protective liner is applied to the back surface of the window trim to protect it during the stages between manufacture and installation (e.g., packaging, shipping, local transport, etc.). Because the back surface of the trim is the part of the trim that is visible after installation, it is preferable that the back surface be substantially smooth and free of scratches and other defects. The protective liner may be any material that will adhere to the back surface of the trim and protect it from scratching, and which can be easily removed prior to installation. A preferred material for the protective liner is polyethylene film (e.g., 2 mil polyethylene with 0.5 mil acrylic).

The following example provides an illustration of the properties, characteristics and advantages of an embodiment of the present invention.

Example 1

A trim strip apparatus according to the present invention having blade-made cuts along an axis parallel to the length of the strip was compared with a somewhat similar trim strip made by RWD Innovative Specialty Trims LLC having at least one groove, wherein the groove is made using teeth in the extrusion die so that the groove is formed when the soft trim strip leaves the mouth of the extruder at the die. This trim strip appears to be identical to the trim strip described and depicted in U.S. Pat. No. 7,220,472 to Rivest et al ("'472 product"), and has the same thickness, and is made of the same or similar material as, the trim strips of the present invention.

The blade cuts of the trim strip apparatus of the present invention and the grooves of the '472 product were microscopically examined under using a ZEISS Model AXIO microscope with a 5× objective lens and fitted with a camera, and compared. The microscope and camera have software required to measure observed features. In addition, each of the blade-scored trim strips of the present invention and the "tooth-grooved" trim strips of the '472 patent were bent around diameters of PVC piping of decreasing size, and the depth and width of the blade-score cuts and the tooth-made grooves were microscopically examined, both at rest and as each is bent around the diameters.

Figure 6:
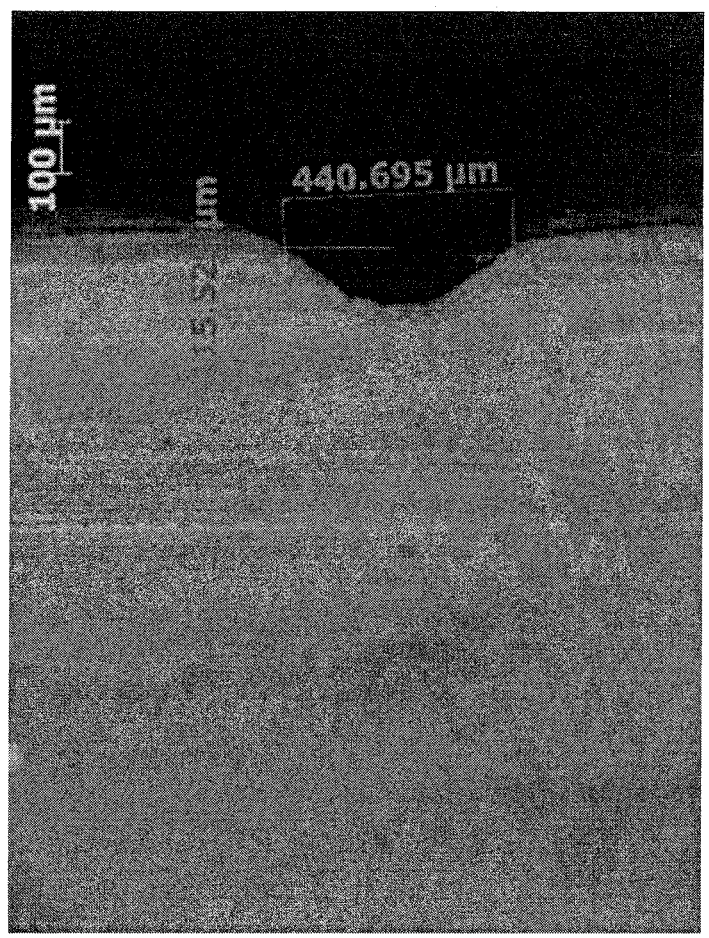
FIG. 6 is a photomicrograph of an unbent trim strip in which a groove of about 116 μm has been made using a toothed forming die.

Photomicrographs were made of an edge-on view of the trim strip disclosed and depicted in the '472 patent. This and all other photomicrographs were taken using the ZEISS Model AXIO microscope. FIG. 6 shows that the unbent, tooth-made grooves of the '472 product trim strips are U-shaped, having a depth of about 116 µm and a width of about 440.7 µm. Although not wishing to be limited by theory, Applicants believe the U-shape of the grooves occurs because when the thermopolymer leaves the extruder and die the trim strip is still quite hot and malleable. The grooves created in the strip as it is extruded from the die immediately begin to fill in with thermopolymer after the tooth rakes the surface of the trim strip. Additionally, the chains of polymer are still forming in the trim strip as the strip is extruded and begins to cool. As a result, this groove does not substantially weaken the structure of the trim strip along the axis of the groove.

Figure 7:
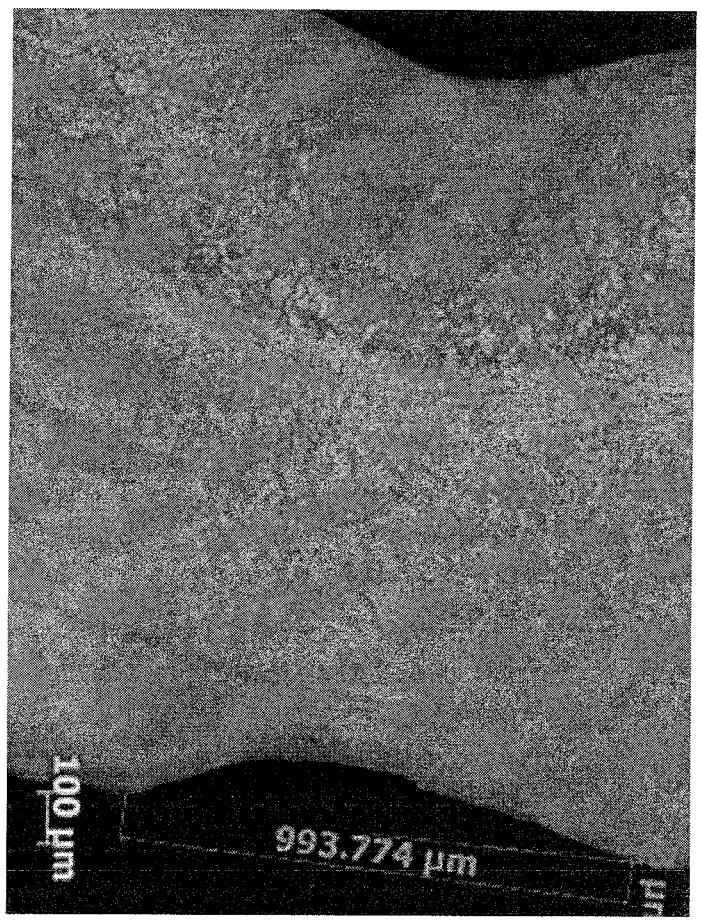
FIG. 7 is a photomicrograph of the trim strip of FIG. 6 after being bent around a diameter of 0.635 cm.

The '472 trim strip of FIG. 6, when bent around successively smaller diameters, failed to break even when bent around a very narrow diameter of 0.635 cm. FIG. 7, a photomicrograph of an edge-on view of the bent, unseparated '471 trim strip, revealed that the depth of the blade-cut groove (about 129.3 µm) was shallower than in FIG. 6 (when the strip is unbent), and the width of the groove is now about 993.8 µm. Also it is possible to see the striations in the polymer, showing that the fibers of polymer to the right of the groove remain relatively unsheared and uncompromised.

A trim strip of the present invention, made from substantially the same thermopolymer as the '472 trim strip, was then examined. However, in this trim strip a blade cut has been made following extrusion of the strip and a cooling step. The blade cut was made to substantially the same depth (116 µm) as the groove of the '472 trim strip (about 8% of the width of the trim strip); the width of this cut was abut 16.5 µm, and the cut was very sharp and well-defined, particularly as compared to the unbent groove of the '472. A photomicrograph of this strip is shown in FIG. 8.

Figure 8:
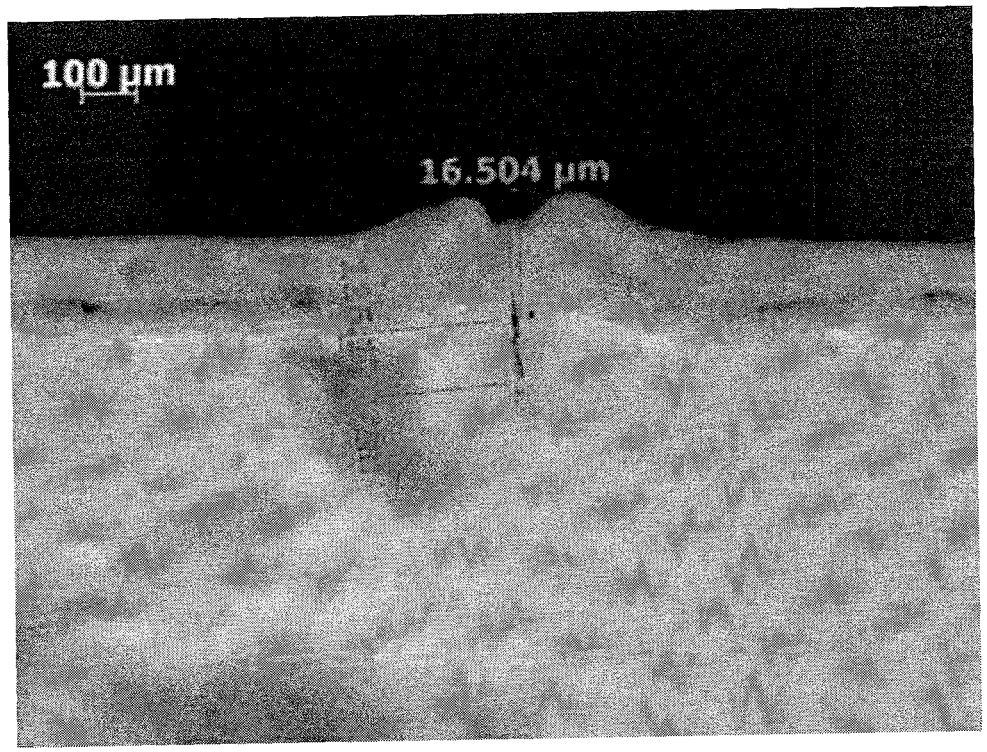
FIG. 8 is a photomicrograph of an unbent trim strip in which a groove about 116 μm has been made using a blade following extrusion.
Figure 9:
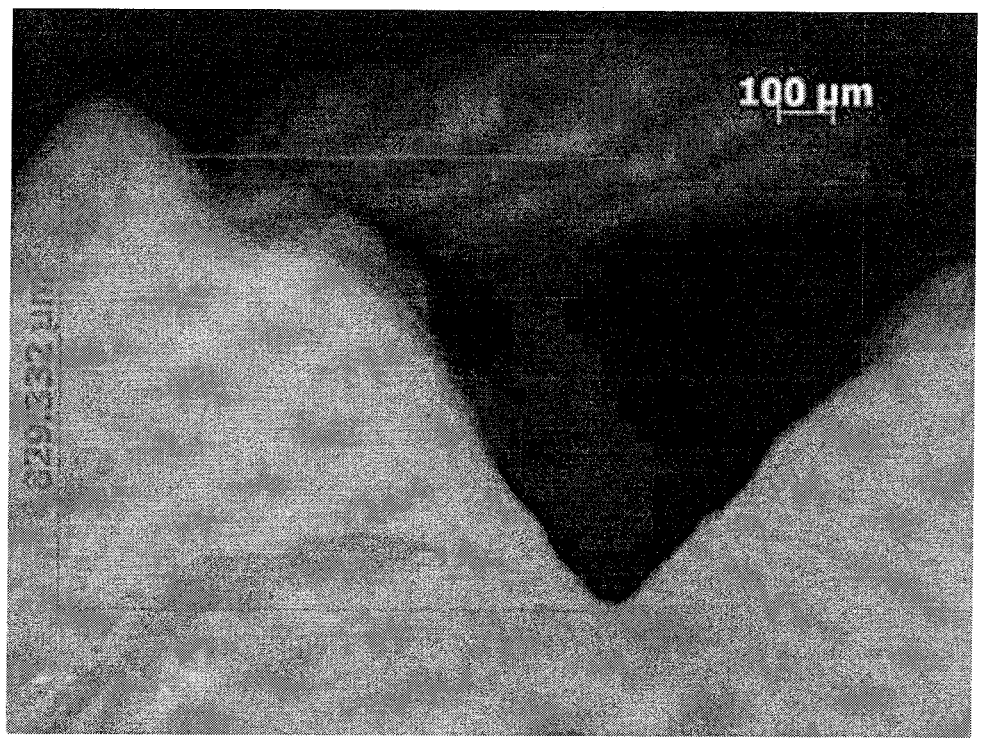
FIG. 9 is a photomicrograph of the trim strip of FIG. 8 after being bent around a diameter of 1.27 cm.

When the trim strip shown in FIG. 8 was bent around successively smaller diameters, the trim strip broke completely (except for a very narrow, easily tearable "skin" or "hinge" that remained in all cases) when bent around a diameter of 1.27 cm. In contrast to the '472 trim strip, the depth of the blade cut increased about 829.3 µm following this bending. See FIG. 9.

Figure 10:
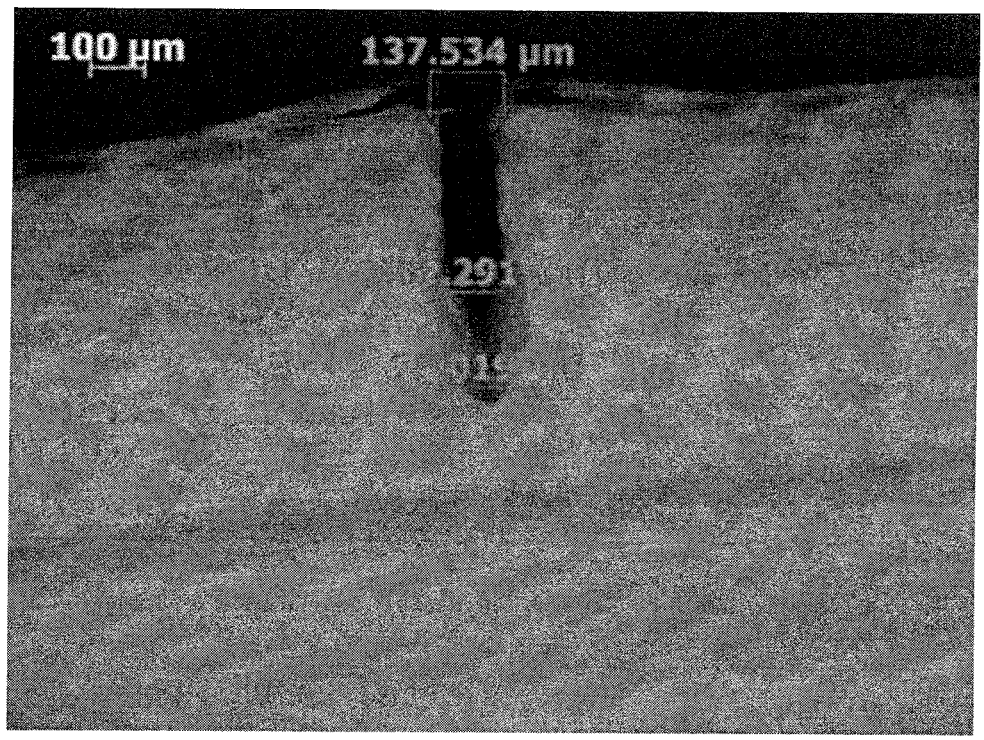
FIG. 10 is a photomicrograph of an unbent trim strip in which a groove about 546 μm has been made using a blade following extrusion.
Figure 11:
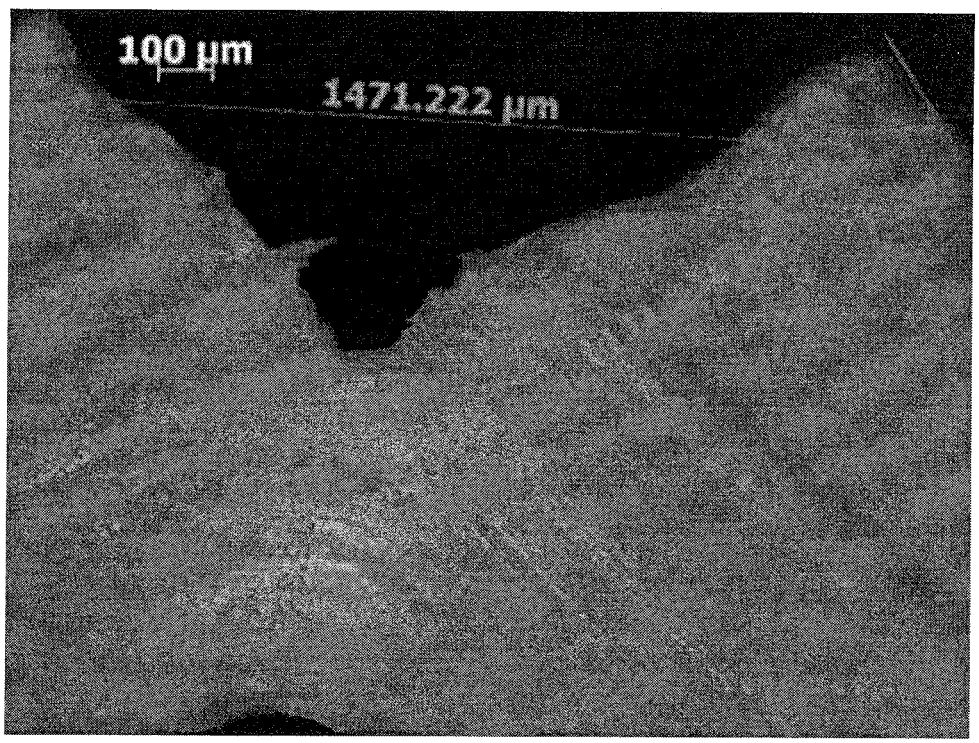
FIG. 11 is a photomicrograph of the trim strip of FIG. 10 after being bent around a diameter of 3.81 cm.

When blade-cut trim strips were made to have depth of about 546 µm (37% of the total width of the trim strip); the width of this cut at rest varied from 77.0 µm at the bottom to about 137.5 µm at the top (FIG. 10). When bent around successively smaller diameters, this strip broke when bent around a diameter of 3.81 cm, when the cut had a depth of about 1131.2 µm and a width of about 1471.2 µm. (FIG. 11).

Figure 12:
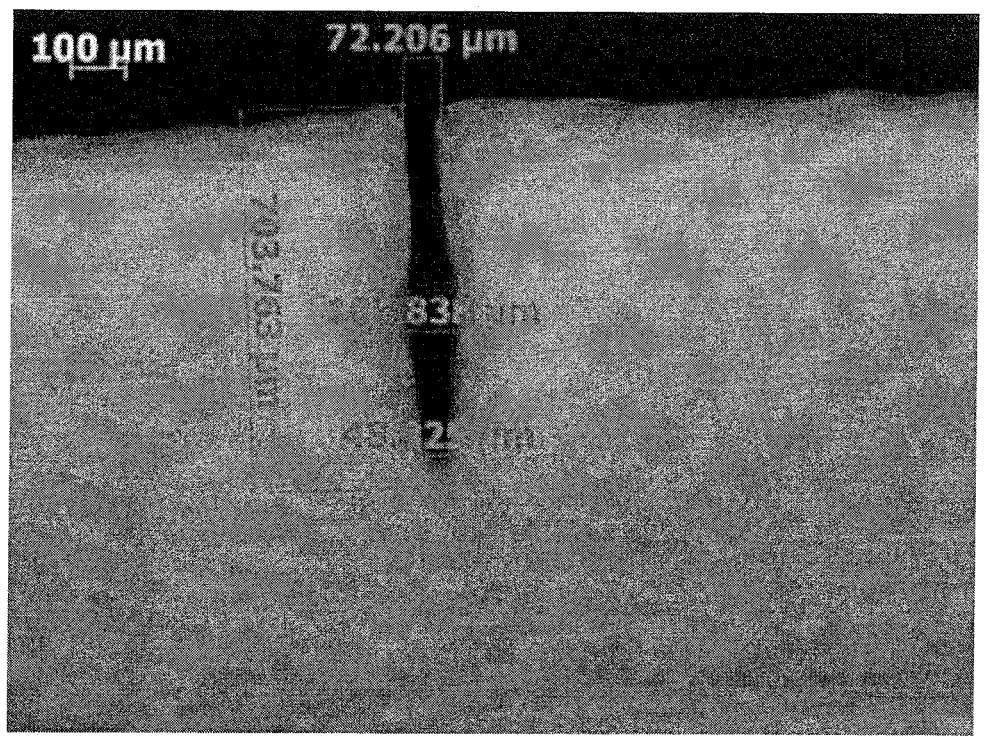
FIG. 12 is a photomicrograph of an unbent trim strip in which a groove about 704 μm has been made using a blade following extrusion.
Figure 13:
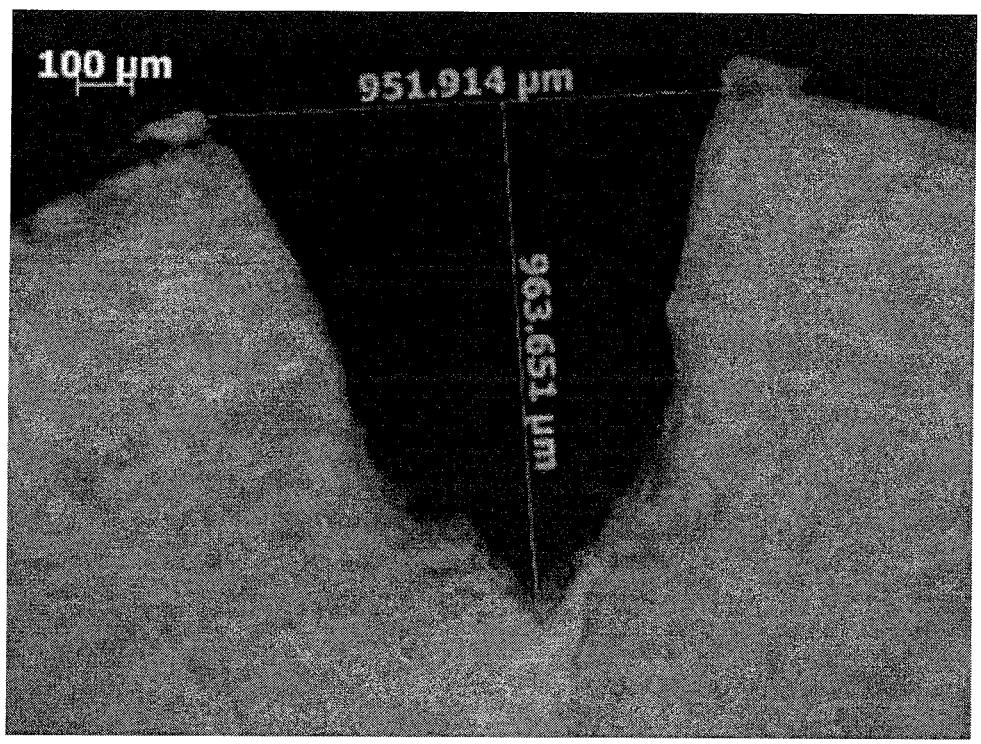
FIG. 13 is a photomicrograph of the trim strip of FIG. 12 after being bent around a diameter of 6.35 cm.

When the blade-cut strip contains a cut having a depth of about 703.8 µm (about 47% of the width of the strip), the cut has a width at rest of from about 48.8 µm at the bottom to about 72.2 µm at the top. (FIG. 12). As shown in FIG. 13, when bent around successively smaller diameters, this strip broke at a diameter of 6.35 cm, when the cut had a depth of about 963.6 µm and a width of about 951.9 µm at the top of the cut.

Figure 14:
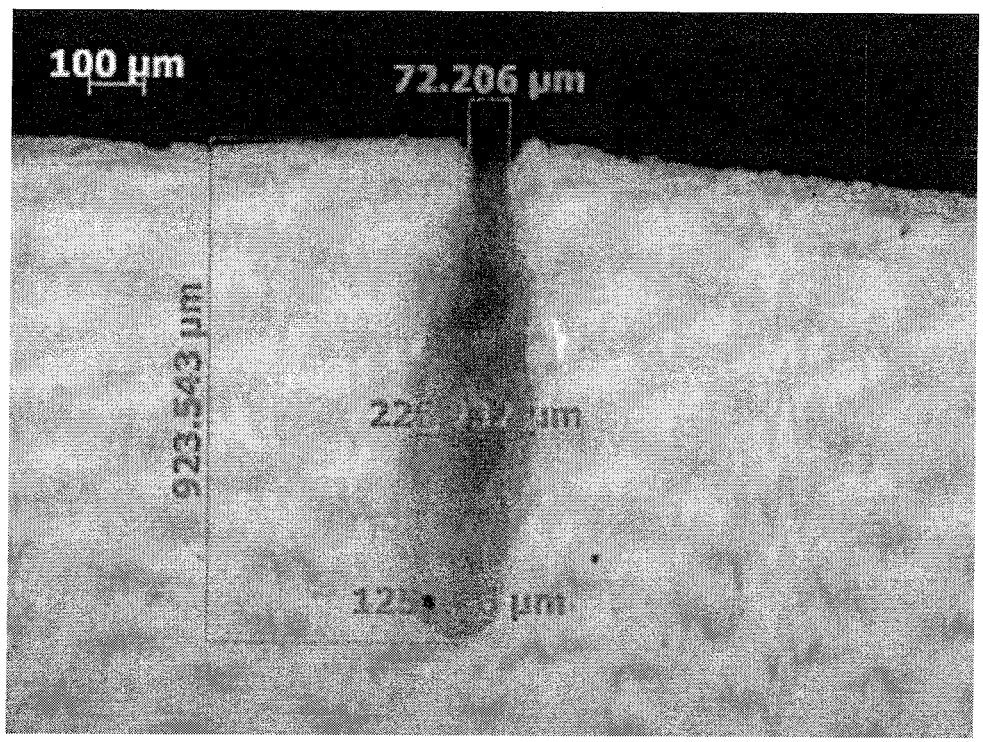
FIG. 14 is a photomicrograph of an unbent trim strip in which a groove about 924 μm has been made using a blade following extrusion.
Figure 15:
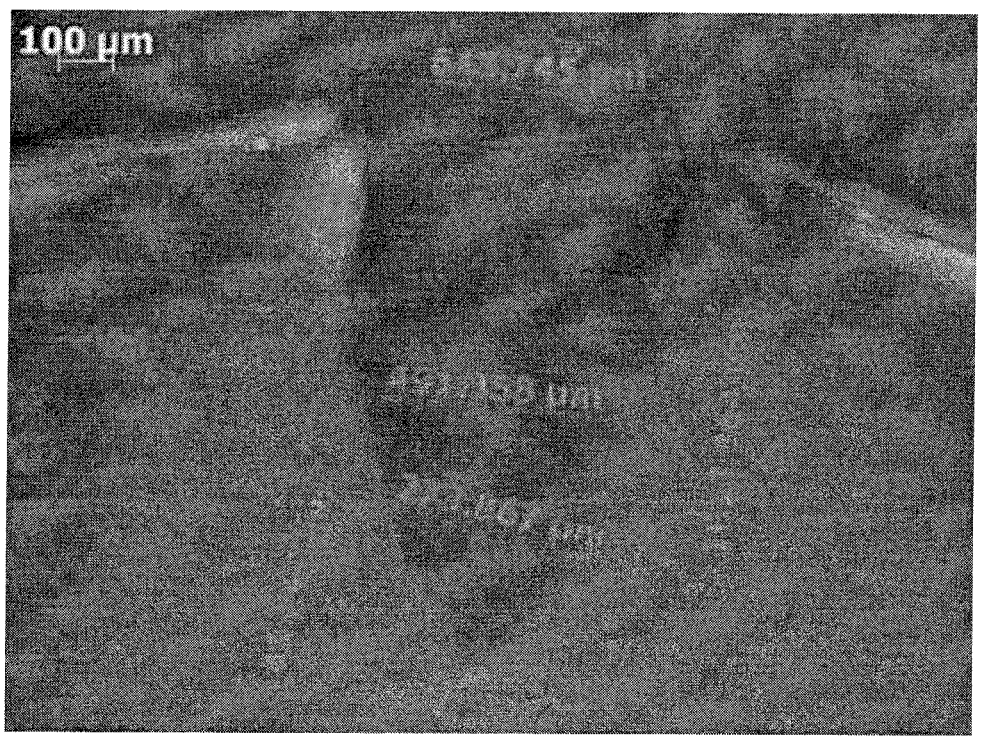
FIG. 15 is a photomicrograph of the trim strip of FIG. 14 after being bent around a diameter of 10.16 cm.

When the blade-cut strip contains a cut having a depth of about 924 µm (about 62% of the width of the strip), the cut has a width at rest of from about 125.1 µm at the bottom to about 72.2 µm at the top. (FIG. 14). When bent around successively smaller diameters, this strip broke at a diameter of 10.16 cm, when the cut had a depth of about 1013.3 µm and a width of about 643.7 µm at the top of the cut. (FIG. 15).

In these experiments, the degree of force required to break the trim strip at the blade cut is a function of the diameter around which the trim strip is bent along the cut. Thus, the smaller the bend diameter, the greater the force required to break the strip at that cut. As seen for the tooth-made grooves of the '472 trim, a simple bend at even the smallest diameter tested failed to break the trim strip, indicating that a greater amount of force is required to break this strip along the groove than is afforded by the smallest diameter tested (0.635 cm).

Figure 16:
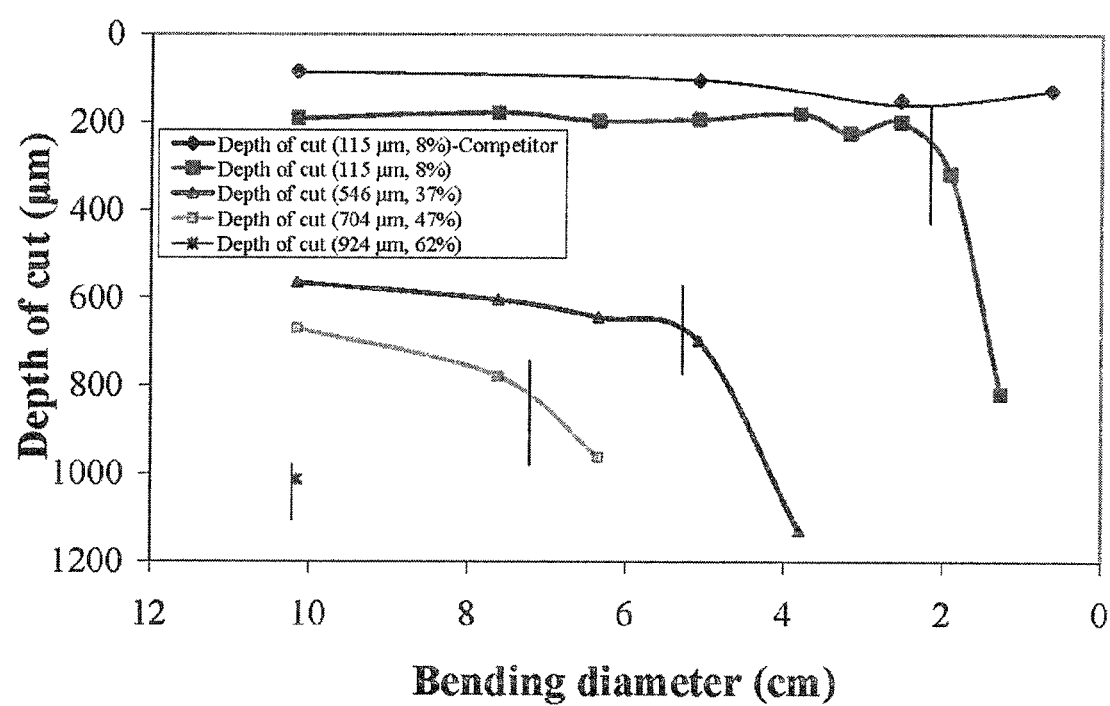
FIG. 16 is a graph showing the bending diameter versus the depth of the blade cut for a similar set of window trim apparatus as shown in FIG. 8-FIG. 15.

The results of a similar set of experiments measuring bending diameter (as a proxy for force applied) versus the depth of the cut. This is graphed in FIG. 16. The vertical line of each of the lines (except the topmost) shows the diameter (an indication of the required force) at which the trim strips broke. The diamond-shaped line at the top represents the '472 tooth-made grooved trim material. As can be seen, the depth of the groove was 115 µm (8% of the trim width) and the depth of this groove did not change appreciably during when the trim was bent around decreasing diameters. The square-shaped line shows the blade-made cut at the same depth (115 µm). In this case the depth of the cut does not change appreciably until the trim strip is bent around a diameter of about 2 cm, when the depth of the cut increases, and this depth increase to about 800 µm when the strip is bent around an even smaller diameter. The triangle-shaped line shows the blade-made cut at an initial depth of 546 µm (37% of the strip width), which breaks at a diameter of about 5 cm and where the depth increases quickly as a greater force is applied. The hollow square-shaped line represents the trim strip having a cut of about 704 µm (about 47% of the strip width); this strip breaks at a diameter of about 7.3 cm and the cut depth of this trim strip also increases quickly as more force is applied. Finally, the trim strip having a cut depth of about 924 cm (67% of width of strip) broke when bent around the largest diameter (smallest amount of force) tested ("X").

These data clearly indicate that blade-cutting the trim strip after the extrusion process results in a materially different, sharper, more V-shaped cut having a reproducible depth, as compared to the die-cut tooth-made grooves of the '472 type trim strips. The blade slices through fibers of the thermopolymer (PVC in this case), creating flat, sharp sides of the cut. Having sliced through fibers, the resulting trim strip is weakened in proportion to the depth of the cut, and the data described herein shows that it requires less force to separate the trim at the blade slice as a function of the increasing depth of the blade slice. (See FIG. 16). Moreover, as described above, the die-tooth-made grooves of prior trim strips neither appear to slice through polymer fibers nor do they sufficiently weaken the trim strip at the groove locus to permit breaking or tearing the trim strip easily by workers without the need to use a knife or blade to score the trim strip prior to breaking or tearing the strip to size.

Figure 17:
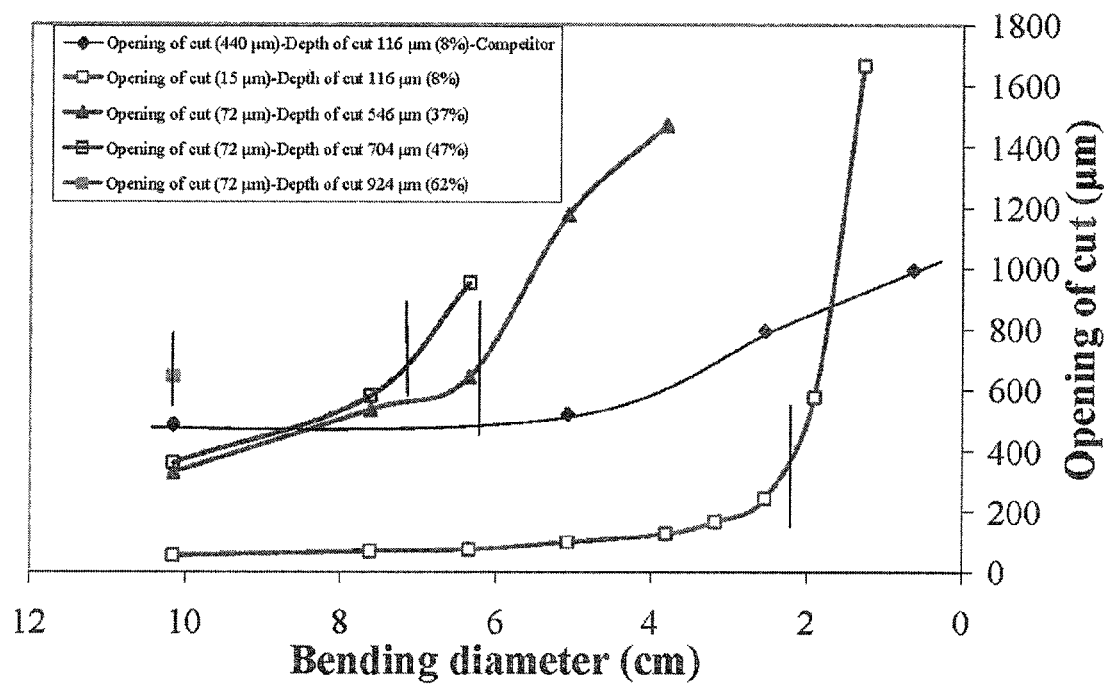
FIG. 17 is a graph showing the effect of the bending diameter on the width of the cut for a similar set of window trim apparatus as shown in FIG. 8-FIG. 15.
Figure 18:
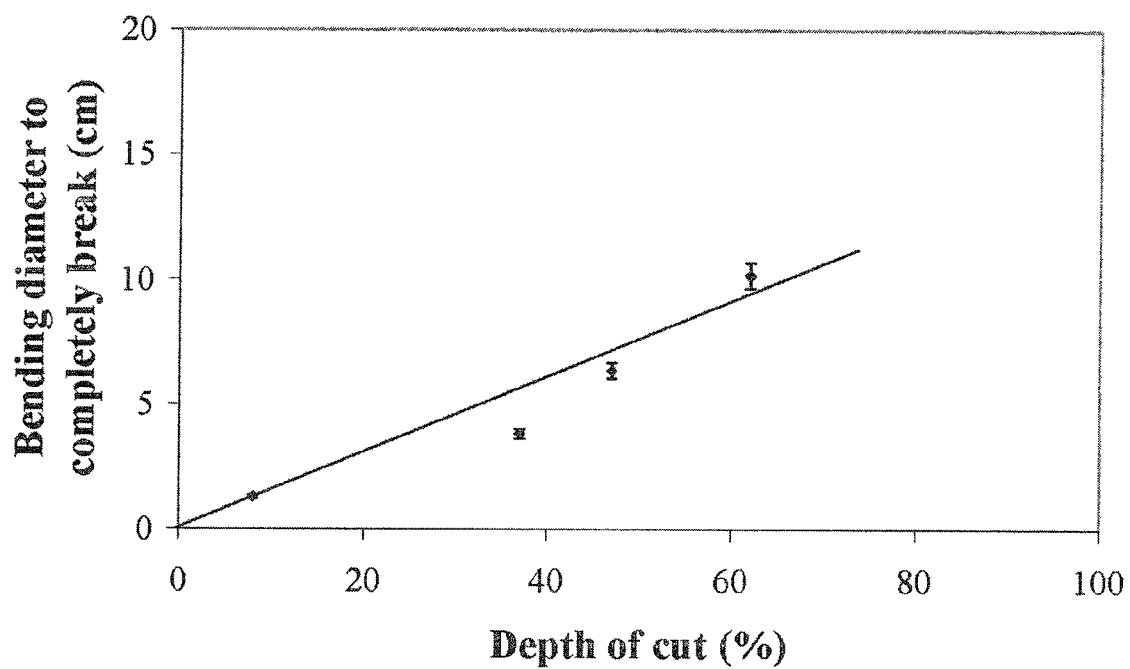
FIG. 18 is a graph showing the bending diameter leading to the complete break of the trim strip versus the depth of the cut for a similar set of window trim apparatus as shown in FIG. 8-FIG. 15.

FIG. 17 shows the bending diameter versus the width of the cut; these data follow the same pattern described above with respect to FIG. 16. Finally, FIG. 18 shows the bending diameter to the complete break of the trim strip versus the depth of the cut, which is an approximately linear function.

The present invention is not limited by the foregoing disclosure or examples, which are only intended to illustrate the invention. Each ingredient, concentration, ratio, and temperature range given is expressly intended to include each and every ingredient, concentration, ratio, and temperature range included within it. The invention is defined solely by the claims that conclude this specification. Each and every publication mentioned or cited in this specification is hereby incorporated by reference herein in its entirety.

What is claimed:

1. A polymeric window trim apparatus comprising: a substantially flat, elongated, extruded, polymeric window trim element having a front surface and an opposing back surface and at least one longitudinally extending blade-cut groove on at least one such surface formed by a stationary blade after extrusion, wherein the depth of the blade-cut groove is between about 15% and about 56% of the thickness of the polymeric window trim apparatus, and wherein the polymeric window trim apparatus is structured to be reduced by tearing the polymeric window trim apparatus along at least one longitudinally extending groove without using a blade.

2. The window trim apparatus of claim 1, which comprises a plurality of longitudinally extending blade-cut grooves.

3. The window trim apparatus of claim 2, wherein the longitudinally extending blade-cut grooves are substantially straight and substantially parallel.

4. The window trim apparatus of claim 1, wherein the surface opposite to the longitudinally extending blade-cut grooves is substantially smooth.

5. The window trim apparatus of claim 2, wherein each of the longitudinally extending blade-cut grooves has a different depth.

6. The window trim apparatus of claim 1, which comprises three longitudinally extending grooves, wherein the first longitudinally extending groove has a depth of about ⅔ the thickness of the window trim apparatus, wherein the second longitudinally extending groove has a depth of about ½ the thickness of the window trim apparatus, and wherein the third longitudinally extending groove has a depth of about ⅓ the thickness of the window trim apparatus.

7. The window trim apparatus of claim 1, which comprises three longitudinally extending grooves, wherein the first longitudinally extending groove is spaced about ⅐ of the width of the window trim apparatus from one edge of the window trim apparatus, wherein the second longitudinally extending groove is spaced about 2/7 of the width of the window trim apparatus from the same edge of the window trim apparatus, and wherein the third longitudinally extending groove is spaced about 3/7 of the width of the window trim apparatus from the same edge of the window trim apparatus.

8. The window trim apparatus of claim 1, which is about 1/16 of an inch thick.

9. The window trim apparatus of claim 1, comprising a longitudinally extending groove having a depth of about 0.04 inches to 0.035 inches.

10. The window trim apparatus of claim 1 comprising a longitudinally extending groove having a depth of between 0.015 inches and about 0.010 inches.

11. The window trim apparatus of claim 1 comprising a longitudinally extending groove having a depth of between 0.015 inches and 0.035 inches.

12. The window trim apparatus of claim 2 wherein a first longitudinally extending groove has a depth of about 0.04 inches to 0.035 inches and a second longitudinally extending groove has a depth of between 0.015 inches and about 0.010 inches.

13. The window trim apparatus of claim 12 wherein a third longitudinally extending blade-cut groove is located substantially parallel to and between the first and second longitudinally extending groove.

14. The window trim apparatus of claim 1, which is about 1¾ inches wide.

15. The window trim apparatus of claim 1, which comprises three longitudinally extending blade-cut grooves, wherein the first longitudinally extending groove is spaced about ¼ of an inch from one edge, wherein the second longitudinally extending groove is spaced about ½ of an inch from the same edge, and wherein the third longitudinally extending groove is spaced about ¾ of an inch from the same edge.

16. The window trim apparatus of claim 1, which comprises a polymeric composite material.

17. The window trim apparatus of claim 16, which comprises polyvinyl chloride (PVC).

18. A polymeric window trim apparatus comprising: a substantially flat, elongated, extruded, polymeric window trim element having a front surface and an opposing back surface and at least one longitudinally extending blade-cut groove, substantially V-shaped and slicing through fibers of a polymeric material in cross section, on at least one such surface formed by a stationary blade after extrusion and prior to complete cooling, and wherein the polymeric window trim apparatus is structured to be reduced by tearing the polymeric window trim apparatus along at least one longitudinally extending groove without using a blade.

19. The window trim apparatus of claim 18 comprising two or more parallel longitudinally extending blade-cut grooves, wherein at least two said grooves have a depth different from each other.

20. A polymeric window trim apparatus comprising a substantially flat, elongated polymeric window trim element having a front surface and an opposing back surface and at least one longitudinally extending groove on at least one such surface, wherein the groove is formed by a stationary blade after extrusion and prior to complete cooling and at least a measurable amount of hardening, and wherein the groove slices through fibers of a polymeric material comprised in the polymeric window trim apparatus.

21. A polymeric window trim apparatus comprising: a substantially flat, elongated, extruded, window trim element comprising a polymeric material, and having a front surface and an opposing back surface and at least one longitudinally extending blade-cut groove on at least one such surface formed by a stationary blade after extrusion, wherein the depth of the blade-cut groove is at least about 15% of the thickness of the polymeric window trim apparatus.

22. The window trim apparatus of claim 21, wherein the at least one longitudinally extending groove slices through fibers of the polymeric material.

23. The window trim apparatus of claim 21, further comprising:
an adhesive component disposed on a surface of the window trim element opposite the surface on which the at least one longitudinally extending groove is formed; and
a protective liner covering the adhesive component.

24. The window trim apparatus of claim 21, which comprises a plurality of longitudinally extending blade-cut grooves.

25. The window trim apparatus of claim 24, wherein the longitudinally extending blade-cut grooves are substantially straight and substantially parallel.

26. The window trim apparatus of claim 24, wherein the surface opposite to the longitudinally extending blade-cut grooves is substantially smooth.

27. The window trim apparatus of claim 24, wherein each of the longitudinally extending blade-cut grooves has a different depth.

28. The window trim apparatus of claim 21, which comprises three longitudinally extending grooves, wherein the first longitudinally extending groove has a depth of about ⅔ the thickness of the window trim apparatus, wherein the second longitudinally extending groove has a depth of about ½ the thickness of the window trim apparatus, and wherein the third longitudinally extending groove has a depth of about ⅓ the thickness of the window trim apparatus.

29. The window trim apparatus of claim 21, wherein the polymeric window trim apparatus is structured to be reduced by tearing or breaking the window trim along the at least one longitudinally extending groove.

30. The window trim apparatus of claim 21, wherein the at least one longitudinally extending groove is formed by the stationary blade after extrusion and at least a measurable amount of hardening of the extruded polymeric material.

* * * * *